United States Patent [19]

Hook et al.

[11] Patent Number: 5,450,492
[45] Date of Patent: Sep. 12, 1995

[54] TRANSPONDER SYSTEM WITH VARIABLE FREQUENCY TRANSMISSION

[75] Inventors: Christopher D. Hook, Finchampstead; Christopher S. Hall, Slough, both of England

[73] Assignee: Disys Corporation, Toronto, Canada

[21] Appl. No.: 946,425

[22] PCT Filed: May 1, 1991

[86] PCT No.: PCT/CA91/00147

§ 371 Date: Oct. 30, 1992

§ 102(e) Date: Oct. 30, 1992

[87] PCT Pub. No.: WO91/17515

PCT Pub. Date: Nov. 14, 1991

[30] Foreign Application Priority Data

May 1, 1990 [GB] United Kingdom ................. 9009739

[51] Int. Cl.$^6$ ........................................... H04K 1/00
[52] U.S. Cl. ...................................... 380/28; 340/572; 340/825.54
[58] Field of Search ............... 380/21, 28, 34; 375/1; 340/825.54, 572

[56] References Cited

U.S. PATENT DOCUMENTS

| | | | |
|---|---|---|---|
| 4,691,202 | 9/1987 | Denne et al. | 340/825.54 |
| 4,829,540 | 5/1989 | Waggener, Sr. et al. | 375/1 |
| 4,864,615 | 9/1989 | Bennett et al. | 380/21 |
| 5,124,697 | 6/1992 | Moore | 340/825.54 X |
| 5,164,985 | 11/1992 | Nysen et al. | 375/1 X |
| 5,321,753 | 6/1994 | Gritton | 340/572 X |
| 5,349,332 | 9/1994 | Ferguson et al. | 340/572 |
| 5,355,120 | 10/1994 | Ferguson et al. | 340/572 |

FOREIGN PATENT DOCUMENTS

| | | |
|---|---|---|
| 0082690 | 6/1983 | European Pat. Off. . |
| 0125143 | 11/1984 | European Pat. Off. . |
| 0253368 | 7/1987 | European Pat. Off. . |
| 0301127 | 2/1989 | European Pat. Off. . |
| 2604808 | 4/1988 | France . |
| 2112607 | 7/1983 | United Kingdom . |
| 2157808 | 10/1985 | United Kingdom . |
| 2163324 | 2/1986 | United Kingdom . |
| 2202981 | 10/1988 | United Kingdom . |
| WO082690 | 6/1988 | WIPO . |

*Primary Examiner*—Tod R. Swann
*Attorney, Agent, or Firm*—Lee, Mann, Smith, McWilliams, Sweeney & Ohlson

[57] ABSTRACT

An electronic identification system comprising a transmitter for generating an electromagnetic excitation signal, one or more portable transponders for storing variable identification data, and for transmitting an information signal containing the identification data upon entering the field. Transmission of the information signal is independent of the excitation signal in both time and frequency. A radio frequency receiver is provided for receiving the information signal and in response generating output signal representing the variable identification data contained in the information signal. The system overcomes two principle disadvantages associated with existing systems: and excitation frequency can be selected for optimum performance given the circumstances dictated by each application; an independent response channel can be selected according to the requirements of each installation or application, thereby allowing response signals to be transmitted by transponders at a frequency which differs form the frequency of an interfering signal.

21 Claims, 6 Drawing Sheets

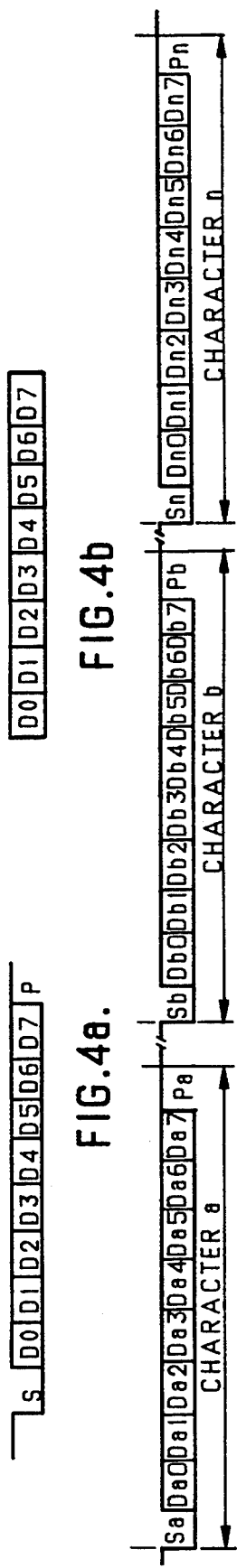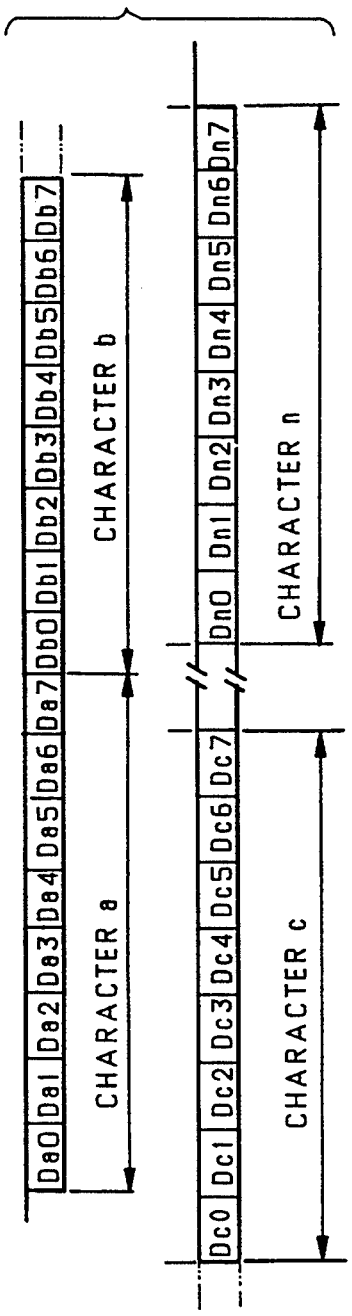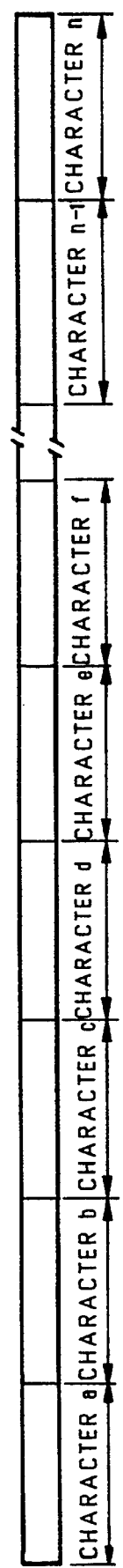

TRANSPONDER SYSTEM WITH VARIABLE FREQUENCY TRANSMISSION

The present invention relates in general to communication systems, and more particularly to an electronic identification system comprising one or more portable transponders for transmitting an information signal in response to entering an electromagnetic excitation field.

Electronic identification systems are well known in the art for effecting automatic identification of objects, animals and people, and are used in situations where elementary line of sight systems such as bar codes cannot be used. Such prior art identification systems typically comprise a plurality of electronic transponders (commonly referred to as electronic tags or simply tags) which are attached to the particular objects to be identified, and at least one interrogator (that is a controlled transmitter and receiver, sometimes referred to as a reader) for exciting the transponders into transmitting response signals which are then detected by the interrogator, decoded and converted into information for display to a human operator, or transmitted as data to a computer.

One such identification system is described in United Kingdom patent application GB 2,112,607 (Senelco Limited) which discloses a system comprising a transponder having a receiver for receiving a transmitted signal S1, a generator for generating a further carrier signal S2, logic means for modulating the signal S2 according to a coded mathematical relationship with the received signal S1, and a transmitter for transmitting the signal S2. Specifically, the carrier frequency of the signal S2 is disclosed as being a multiple or a fraction of the frequency S1.

United Kingdom patent application GB 2,157,132 (Senelco Limited) also discloses an identification system of the form discussed above in connection with the '607 specification, but in addition incorporates circuitry for receiving a reply signal (e.g. information signal) from the transponder, checking the reply signal for possible contention between reply signals from different transponders which arrive at the same time, and initiating retransmission of the reply signals in the event such a contention situation is detected. Specifically, the tag receives a signal from the interrogator which it compares with stored information in order to determine whether the message transmitted by the tag has been received by the interrogator for confirming that the tag has been identified by the interrogator and can therefore fall silent. Contention in this system is resolved by sophisticated duplex communications between reader and tag in order to achieve simultaneous identification of numerous tags.

As with the '607 specification, the circuitry in the '132 disclosure incorporates means for deriving a received carrier signal at the transponder, and using the derived carrier signal to provide a transmission signal which is related to and therefore dependent on the sustained presence of the received signal from the interrogator.

Additional prior art systems are well known for teaching transmission of the transponder information signals which are dependent on the received interrogation signal, as follows:

European patent application 0,310,127 (Texas Instruments) teaches a transponder arrangement which transmits an information signal at a predetermined carrier frequency related to the frequency of a received RF interrogation pulse.

United Kingdom patent application GB 2,202,981 (Satellite Video Systems Ltd.) discloses a system incorporating a transponder designed to modify a received interrogation signal in a variable manner and then retransmit the modified signal for reception by the interrogation unit.

United Kingdom patent application GB 2,163,324 (Electromatic) discloses a system in which energy is extracted from a detected interrogation signal, compared to a reference level and then supplied to the remainder of the transponder circuit for enabling generation and transmission of the information signal.

European patent application 0,253,368 (Amtech Corporation) discloses an identification system comprising a reader and a transponder, the transponder being adapted to receive an interrogation signal and in response generate a modulated response.

A fundamental disadvantage of such prior art systems in which the information signal transmitted by the transponder is related to (i.e. dependent on) the received interrogation signal, is that in situations in which there is fast relative movement between the transponder and the interrogator there may be insufficient time for the transponder to extract the carrier signal and thereby have the means to generate and transmit the required information signal. Specifically, tags such as those described in GB 2,112,607 and GB 2,157,132 which require the sustained presence of the excitation field in order to provide a response signal, will cease transmitting immediately once the excitation signal falls below a certain level. Since the interrogator in these systems expects to sample data from the tags in bit-contiguous format, sampled with respect to the interrogator's transmit clock reference signal, data sampled by the interrogator will be corrupted and the partial message must be discarded. This is a real practical problem with previous systems where the level of signal detected by a tag is highly dependent upon the relative orientation of tag and excitation antennae, such that as a tag passes an antenna it may at various times during its passage go through nulls when it will cease transmission. The problem is especially acute in systems such as that disclosed in GB 2,112,607 where the tag transmits its stored data at a very low rate.

In addition, such prior art interdependence between the frequency of the excitation signal and the frequency of the transmitted information signal imposes practical limitations on the frequency range of signals which can be used for interrogation and transmission of the information. The rigid mathematical (harmonic) relationship between the excitation and response signals in systems such as that disclosed in GB 2,112,607 further complicates the design of the receiver in the interrogator. It is almost inevitable that harmonic components of the excitation carrier signals will be present and these must be eliminated from the signal reception channel in order to yield an acceptably high signal to noise ratio.

A further disadvantage of such prior art systems is that the transponder is typically tuned to a specific frequency depending on the particular application. For example, communications using low frequency electromagnetic signals are ideal in situations where the transponder is enveloped in material which causes significant attenuation of radio signals, such attenuation being much less pronounced at low frequencies than high frequencies. However, such transponders which are receptive to low frequency excitation signals would be inappropriate for applications in which a degree of directionality is required. An example of such an application would be the use of a transponder which is receptive to microwave signals wherein a portable reader and antenna can be aimed at a target object amongst a group of objects each with an attached transponder in order to identify the particular object. A transponder which is receptive to microwave signals offers the opportunity to design such a directional system and identify transponders at a greater range than when using low frequency excitation signals.

In certain applications, where objects with attached transponders move around a large site or from one site to another, it is possible that at certain times optimum performance would be achieved using a microwave excitation signal yet at other times peak performance would be achieved using a low frequency excitation signal. A practical example of this scenario is the identification of air cargo containers. At times the containers may be resting on a concrete apron at an airport such that line-of-sight identification is possible using a microwave excitation signal, while at other times the containers are in the holds of aircraft or maybe in a warehouse or loading/unloading area which may be constructed partly of metal. Since microwave signals behave in a manner similar to light, problems resulting from reflection of the microwave signals can give rise to uncertainty about the path of the excitation signal and potentially cause excitation of more than one transponder inadvertently.

A second disadvantage associated with the single excitation frequency of the prior art transponders is that, for general applications, government regulatory authorities do not typically grant exclusive use of predetermined operating frequencies to the user of a transponder identification system. This means that the users must operate in certain approved frequency bands which are often shared with, for example, low power telemetry systems. As such, the transponder identification system is subject to interference from other signals which may originate from intentional radiators also operating in a particular frequency band or from high powered equipment generating spurious signals which fall within the frequency band used by the transponder. Conversely, a transponder identification system operating in such a band may cause interference to other systems sharing the same band width. Thus, it may not be possible to install a transponder identification system at a particular location because of interference from external signals in the same frequency band, resulting in severe degradation in performance of the identification system, or the risk of causing interference to the other systems.

A further prior art electronic identification system is disclosed in FR A 2 604 808 (Bazin) which teaches the use of a radio electric receiver which waits to receive a coded signal which is adequate to start up a timing processor. When the latter is activated, it activates a radio electric emitter, then activates a memory-reading processor, waits for the end of the information transfer, stops the radio electric emitter and waits for a fraction of a second before returning to stand-by. However, as with the prior discussed references, there is no teaching in the Bazin reference of generating an information signal at a frequency which is neither derived from nor related to the frequency of the electro-magnetic excitation field.

It is an object of an aspect of the present invention to provide an electronic identification system comprising:
a) means for generating an electromagnetic excitation field at a first variable frequency,
b) portable transponder means for storing variable identification data, and for transmitting at a second variable frequency an information signal containing said data upon entering said field, said transmitting of said signal being independent of said transponder means remaining in said field, said second variable frequency being neither derived from nor related to said first variable frequency of the electromagnetic excitation field,
c) means for receiving said information signal and in response generating an output signal representing said variable identification data contained in said information signal.

It is also an object of an aspect of the present invention to provide a transponder which can produce a response signal whose frequency can be set according to the conditions encountered at a particular site, thereby maximizing the range of applications and sites to which the system may be applied without modification of the transponder's circuits. This can be seen to have further advantage, where in the absence of internationally acceptable operating frequencies for these transponder systems, it would be possible to have a transponder attached to an intermodal container, for example, identified at the point of loading onto a ship in one country, with the transponder set to produce a response signal at frequency $f_1$, say, then on arrival in another country instructed to change the frequency of its response channel so that it could be identified by receiving signals at frequency $f_2$, say, where neither frequency $f_1$, or $f_2$, were acceptable in both origin and destination countries.

According to the present invention, an electronic identification system is provided having a portable transponder for generating and transmitting an identification or information signal independently of continued presence of the interrogation signal. Thus, the system of the present invention may be operated with interrogation and information signals from virtually any frequency over the entire electromagnetic spectrum (e.g. ranging from DC at the low frequency end of the spectrum to light frequency at the high frequency end). In addition, the system of the present invention may be utilized in applications where there is fast relative movement between the transponder and the interrogator.

According to a preferred embodiment of the invention, a transponder is provided which is selectively responsive to various excitation frequencies, thereby facilitating performance optimization according to predetermined applications and operating specifications.

According to an additional aspect of the invention, digital signal inputs are provided for the transponder, in order to sample external inputs and report back the results along with the identification information, thereby permitting remote monitoring of the state of digital signals representing physical variables such as temperature or pressure.

According to a further aspect of the invention, the information signal may be encrypted prior to transmission using a pseudo-random varying key generated automatically by the tag.

In addition, the transponders of the present invention are reprogrammable during use, by means of modulated radio signals generated by the interrogator.

Furthermore, the tag according to the present invention formats and transmits data at standard rates, the precise nature of which is a programmable feature of the tag, which means that a reader may in its simplest form comprise the excitation signal generator (transmitter) and signal receiver alone without there being the need for a data processing element (e.g. a microprocessor). Post demodulation, the format of data received from a tag is such that it can be presented directly to a computer via a serial interface, operating in either a synchronous or asynchronous reception mode.

This is a radical departure from previous systems in which the rate and format of the data transmitted by a tag are such that it must be processed (either in format and/or rate) prior to being offered to a computer via a standard serial interface.

A preferred embodiment of the invention will be described in greater detail below with reference to the following drawings, in which:

FIGS. 4a–4e illustrate the character and message composition of the information signal transmitted by a tag, in accordance with the present invention;

Figure 1:
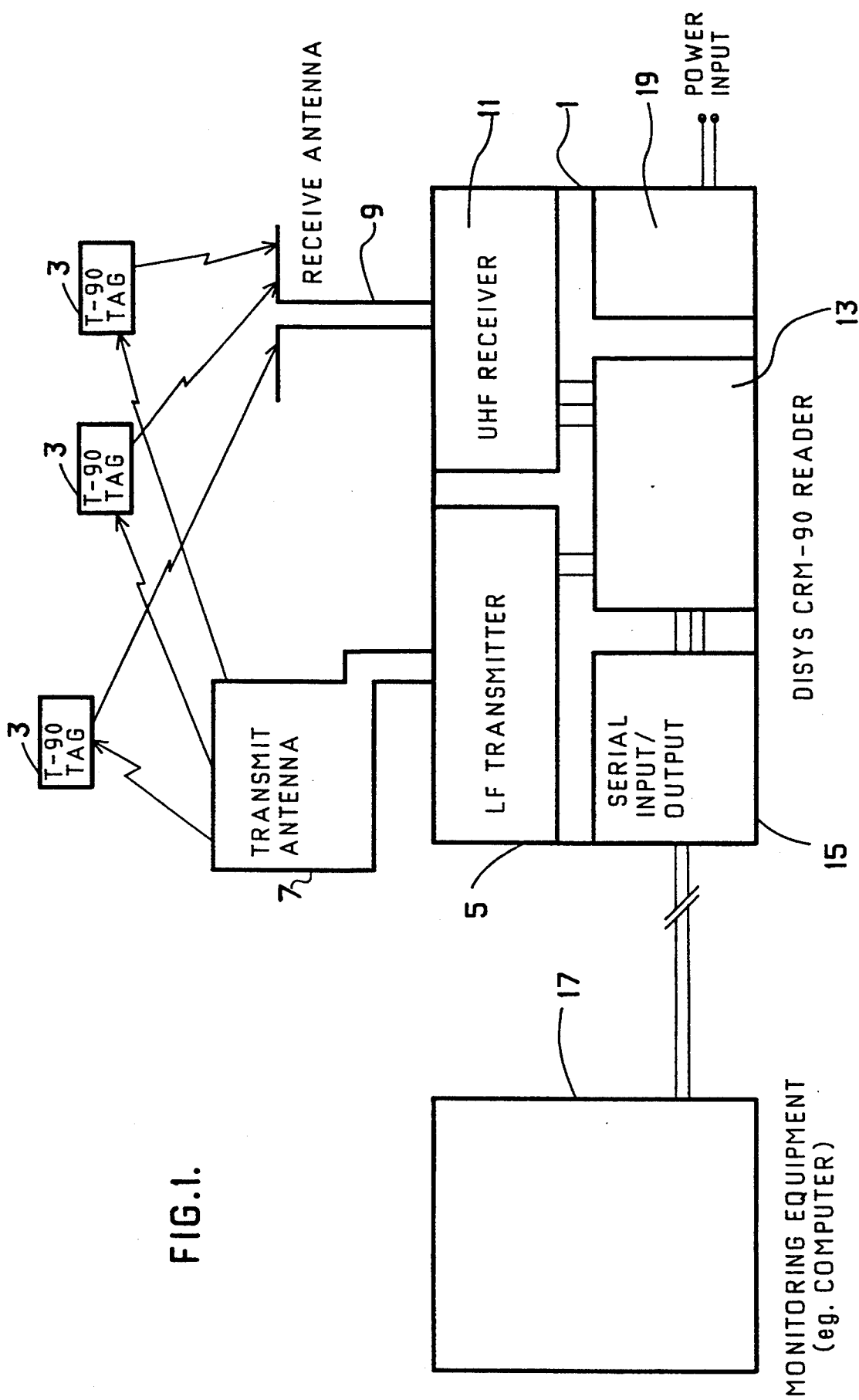
FIG. 1 is a block diagram of the identification system according to the present invention.

Turning to FIG. 1, a block diagram of the identification system of the present invention is shown in its most general aspect. The system comprises an interrogator/reader (herein referred to as reader 1) and a plurality of transponders (herein referred to as tags 3) which are attached to objects to be identified (e.g. animals, people, vehicles, etc.). The reader 1 generates an excitation field by means of a radio frequency (RF) transmitter 5 connected to a transmit antenna 7. Respective ones of the tags 3 are adapted to transmit the response or information signals for, among other things, identifying the associated object.

The reader 1 receives the information signals by means of a receive antenna 9 connected to an RF receiver 11. The received information signals are decoded and converted into a suitable output signal by means of microcontroller 13 and serial input/output circuit 15 for display to a human operator, or for use by a computer or other monitoring equipment 17.

As will be discussed in greater detail below, each of the tags 3 is in the form of a miniature radio frequency receiver and transmitter, which can store and transmit the coded information signal upon detecting the excitation signal, for conveying the identity and other characteristics of the associated object to the reader 1. The circuitry of the tags 3 are sealed in respective small, light weight plastic cases. Information stored in the tags 3 may be altered by means of variable control signals generated by transmitter 5 and antenna 7 under control of microcontroller 13, and may be modified by a user according to specific individual requirements. Furthermore, the tags 3 may, if required, be write-protected so that the data may not be changed.

The microcontroller 13 of reader 1 detects, analyses and formats the information signal received from the tags 3, and presents error free information in a variety of formats, as required by each individual application.

Serial input/output port 15 allows for direct connection of the reader 1 to a computer or other monitoring equipment 17. In addition, reader 1 is provided with output ports which are electrically and functionally compatible with industry standard identification and data capture systems such as magnetic card reader heads and bar code wands, in addition to the duplex serial communications port 15 for connection to a computer. Thus, these special, dedicated output ports allow for easy integration of the reader 1 into existing identification and data capture systems without modification to the system software.

For the purposes of describing a practical system, the RF transmitter 5 shall be a low frequency (LF) transmitter. Antenna 7 is in the form of a simple tuned or untuned wire loop which generates an electromagnetic field for exciting the tags 3. As discussed above, the transmit antenna 7 is driven by transmitter 5 and is connected to the reader 1 preferably by means of a screw terminal connector for convenience and ease of installation. The size of the loop is determined by each application, and may be as small as approximately 50 mm diameter where only short range operation is required, or may be wound round a door frame or other similar sized aperture in applications requiring the identification of personnel.

Microcontroller 13 is configurable for operation in many user defined modes, as required for each application. The configuration information is stored in an electrically erasable, non-volatile memory ($E^2PROM$) under control of microcontroller 13. For example, the reader 1 may be configured to transmit information every time it reads data from a tag 3, or alternatively to transmit data from a particular tag 3 once only following an initial detection.

In operation, the reader 1 essentially emulates a card reader or bar code wand according to well known techniques, and generates an output signal in the form of serial logic presented via integrated output ports.

The reader 1 may be powered by a regulated or an unregulated DC or AC supply, in a well known manner. The power supply 19 regulates the input power signal and derives a local +5 V DC signal for internal logic circuitry (e.g. microcontroller 13) as well as a +12 V DC signal for the analogue circuits (e.g. transmitter 5, receiver 11).

Figure 2:
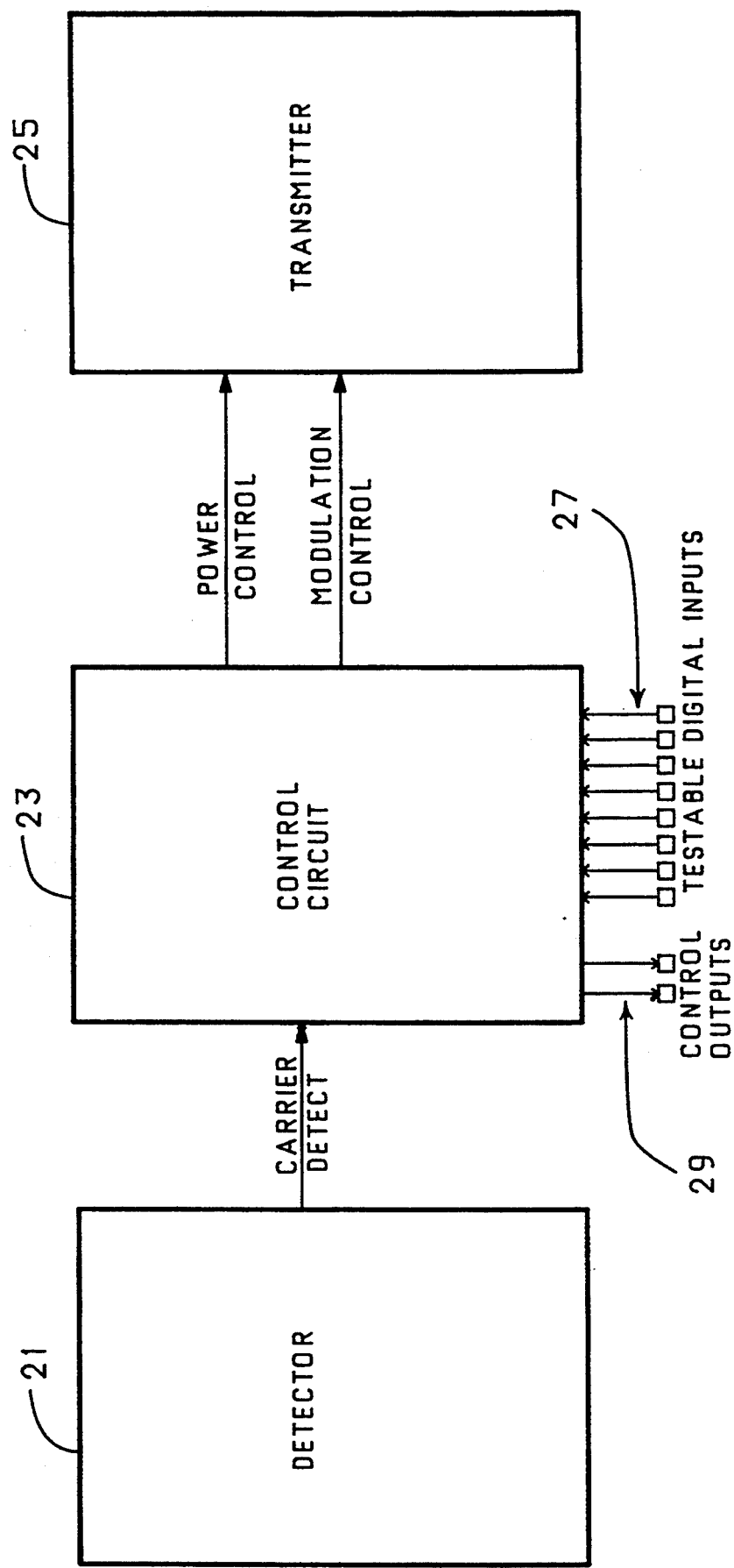
FIG. 2 is a block diagram of the transponder or tag in accordance with a first embodiment.

Turning to FIG. 2, a representative transponder or tag 3 is shown comprising a detector 21 connected to a control circuit 23 which in turn is connected to a transmitter 25. As discussed above, an important aspect of the present invention is the independence in operation of the detector 21 and transmitter 25. Specifically, the transponder or tag 3 is designed to transmit an information signal via transmitter 25 upon detecting the excitation field by means of detector 21. Yet, in accordance with the invention, transmission of the information signal is independent of sustained presence of the transponder or tag 3 within the excitation field.

Furthermore, the transmitter 25 according to the present invention generates an information signal imposed on a carrier frequency which is neither derived from nor related to the frequency of the excitation field sensed by detector 21, in contrast with the prior art systems described in European patent application 0,253,368 and United Kingdom patent applications GB 2,202,981; 2,112,607; and 2,157,132.

In its basic form, the electronic circuitry of the tag 3 is protected by a thin, resilient plastic case, intended to provide protection against accidental damage. According to a successful prototype of the invention, the plastic case measures less than 50×40×7 mm and weighs less than 20 grams. The case is sealed rendering it impervious to the ingress of moisture and dust particles.

A plurality of digital inputs 27 are also provided for monitoring the state of digital input signals from external sensors such as temperature, pressure, or simple switches, and a plurality of control outputs 29 are provided (only two such outputs being shown for convenience) for optional control of external devices connected to the tag 3 (e.g. an LED for confirmation of reprogramming, audible alarm buzzer, etc.). These outputs may be actuated in a predetermined manner under the control of the program stored in the tag's control circuit, or alternatively following receipt of an instruction from the reader 1.

The sampled input information is reported to the reader as part of the information signal transmitted via transmitter 25. According to this feature, additional applications of the identification system may be provided without re-engineering the circuits at the heart of the identification system.

Figure 3:
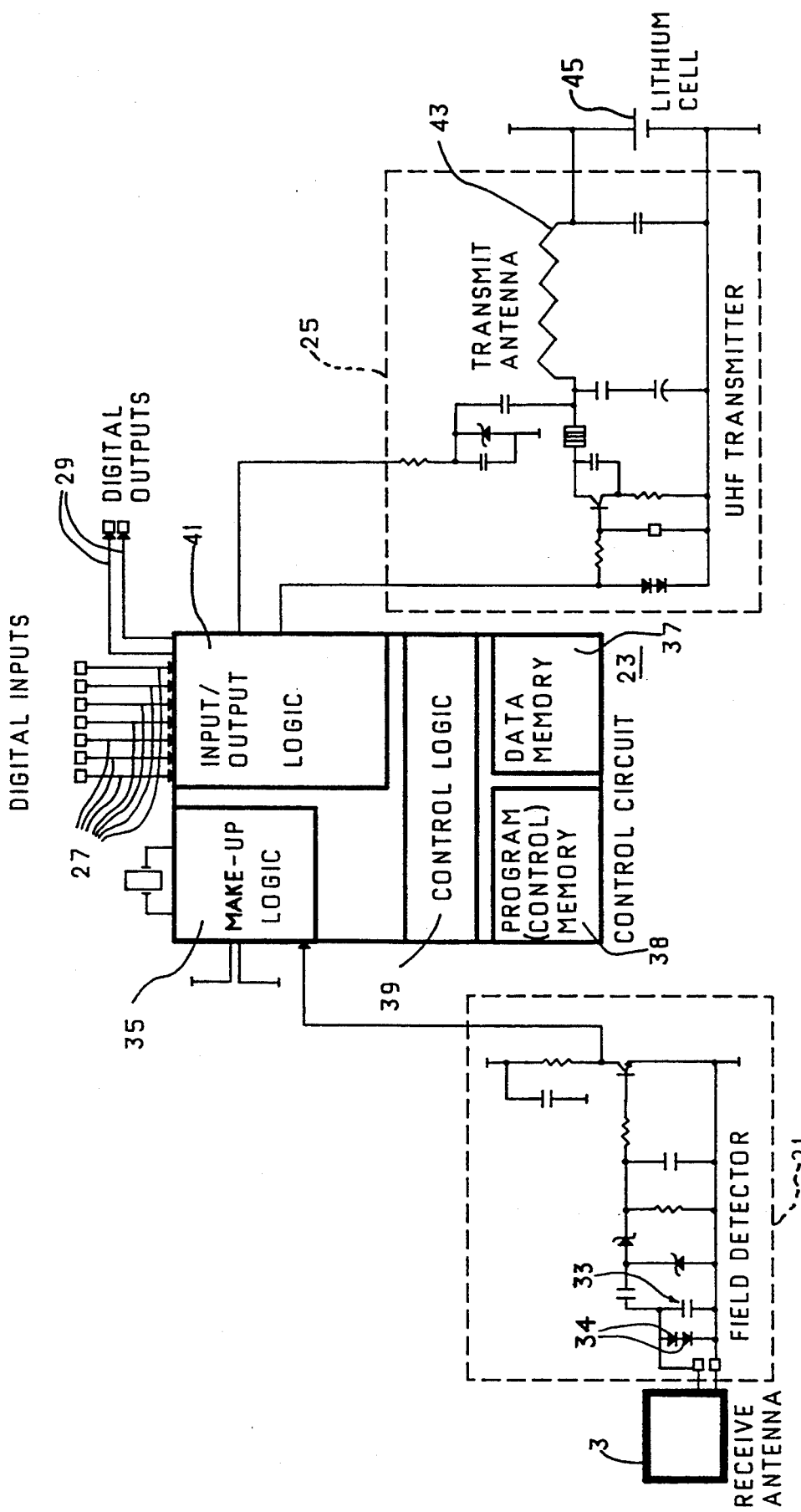
FIG. 3 is a partial schematic/block diagram of the transponder illustrated in FIG. 2.

The tag 3 is shown in greater detail with reference to FIG. 3 comprising a receive antenna 31 forming an inductive loop connected in parallel with a capacitor 33 for forming a parallel tuned circuit with a resonant frequency of approximately 135 kilohertz. The receive antenna is connected to detector 21. Upon entering the excitation field generated by the reader 1, the detector 21 senses the presence of the field and in response generates a carrier detect signal to wake-up logic circuitry 35 associated with the control circuit 23. Internal data memory 37 of control circuit 23 stores user definable information and identification data which is encoded into an information signal by means of control logic 39 and then output to the transmitter 25 as a modulation control signal via input/output logic circuitry 41. Operating software for the tag 3 is stored in a program (control) memory 38. The transmitter 25 is enabled by means of a power control signal also received from input/output logic 41 under control of logic circuitry 39 and in response transmits the required information signal by means of a transmit antenna 43, in a well known manner.

According to an important aspect of the present invention, an onboard power source is provided in the form of a primary cell such as the lithium cell 45 having a nominal terminal voltage of 3 V, and being connected to control logic circuitry 39. The provision of an onboard power source means that the tag 3 is not required to extract operating power from the excitation field, in contrast with the prior art system disclosed in United Kingdom patent application GB 2,163,324. The control logic circuitry 39 monitors the condition of the lithium cell 45 and reports the amount of charge to the reader 1 in the transmitted information signal along with the user specified data contained in memory 37, such that the system monitoring computer 17 is provided with an early warning that the tag 3 is nearing the end of its useful life, and will therefore require replacement.

In operation, the tag 3 remains in a dormant or quiescent state when it is out of range (e.g. more than 3 meters away) from the excitation antenna 7 of reader 1. In the idle state, the tag 3 consumes negligible power from the lithium cell 45, and transmitter 25 is downpowered by the control circuit 23.

The excitation antenna 7 is driven by transmitter 5 for generating a localized electromagnetic field which is detected by the tag 3 by means of antenna 31 and detector circuit 21. In response to detection of the electromagnetic field and generation of the carrier detect signal by detector circuit 21, wake-up logic circuitry 35 enables the control logic 39 to retrieve the necessary user specified data in memory 37 and enables input/output logic circuitry 41 to generate the required information signal for transmission via transmitter 25. As discussed above, the control circuit 23 also monitors the charge state of lithium cell 45 by briefly enabling an on-board micro-power voltage comparator (not shown), and responsive to the result of comparison generating a status bit for inclusion in the transmitted information signal.

Unlike prior art transponder identification systems, the tag 3 of the present invention is programmed such that it requires only a very brief excitation signal for enabling it to transmit the information signal. This aspect, coupled with the use of an efficient UHF transmitter 25 eliminates the necessity in prior art systems of requiring the sustained presence of the excitation signal for the duration of transmission of the information signal. Consequently, it is possible according to the present invention to identify objects which are moving at a high speed relative to antenna 7, without requiring the antenna 7 to be of unmanageably large dimensions.

According to the preferred embodiment, the tag 3 stores up to 32 bytes of user specified data within memory 37. Of course, the number of characters stored is limited only by storage capacity of memory 37. This data relates to information about the object to which the tag 3 has been attached. The data is stored in a "free field" format, which means that the data may be interpreted in different ways according to each application.

The data stored in memory 37 is reprogrammable by the user, by means of sending coded, modulated radio signals to the tag 3 from the reader 1 via antenna 7. Programming of the tags 3 does not require contact with the reader 1 to perform this function.

Programming of the tag is initiated by generation of a keyword signal by reader 1, followed by programming instructions, and, if required, additional user specified data. The tag 3 compares the received keyword with a stored version of the keyword, and in the event the comparison fails to match the keywords, the tag 3 denies access to memory 37. In addition to this first level of programming security, the reader 1 and tag 3 may exchange instructions and responses in a rigidly defined "hand-shake mode" such that if this mode is not followed, the tag 3 will again refuse access to the memory 37.

It is possible to write protect the tags 3 by incorporating a "read only flag" associated with the control logic circuitry 39 for rendering the tag 3 effectively "read only" such that it may not be reprogrammed by the user. The read only flag is analogous to a read only attribute appended to a file stored on a computer disc according to well known prior art.

After programming data has been sent to the tag 3 for storage in memory 37, the reader 1 may assert the read only flag such that the tag 3 will thereafter not allow the data stored in memory 37 to be altered. However, this protection may be removed by an instruction generated by the reader 1 for over-writing the write protection.

The tag 3 may also be programmed to generate a unique (characteristic) information signal upon egress from the excitation field so that the reader 1 is notified that the object bearing the tag has exited from the field of influence of the excitation signal.

In order to accommodate different applications, the identification system of the present invention is designed to form a turnkey system for an end user. For example, in a personnel identification system it is a prerequisite that many tags 3 can be identified at the same time—simultaneous identification—yet the identification process can be relatively slow (e.g. 100–200 milliseconds). In contrast with the personnel identification application, identification of a fast moving object such as a car will typically not require simultaneous identification. Thus, each tag 3 can be configured to optimize its performance for any applications by simply programming the tag 3 with special instructions via the reader 1. Table 1 lists the programmable variables for the tags 3 which may be modified by the reader i to tailor the performance of the system to each individual application.

TABLE 1

| Parameter | Range |
| --- | --- |
| Number of data bytes transmitted per message | 1 to 32 |
| Number of initial message transmissions immediately following detection of the excitation signal | 1 to 15 |
| Delay between detection of the excitation signal and transmission of initial message packets, measured as a multiple of a single message duration | 1 to 15 |
| Interval between message transmissions subsequent to initial message transmissions, measured as a multiple of a single message duration | 1 to 250 |
| Number of repeated single message transmissions after transmission of set number of initial messages | 0 to 255 or unlimited |
| Transmit data rate (bits per second) | 4800 to 38400 |
| Burst mode (send set number of messages following detection of the excitation signal, regardless of presence or absence of that signal) | yes or no |
| Encrypt data prior to transmission | yes or no |
| Write protect user-data | yes or no |
| Transmitted data format | sync or async |

As can be seen from Table 1, some notable features of the present invention include initial pseudo-random delay, variable interval between successive retransmissions, variable number of retries and data encryption prior to transmission- The features of initial pseudo-random transmission delay, variable interval between successive retransmissions, and variable number of retries are used to accommodate simultaneous detection of information signals in applications such as personnel identification.

Simultaneous detection of information signals from numerous transponders is known in the prior art. Some systems, such as those disclosed in United Kingdom applications GB 2,202,981 and GB 2,157,132 use sophisticated polling schemes in order to resolve contention between transponders competing for a single channel communication link to the reader or interrogator. However, such prior art techniques suffer from the disadvantage of requiring two-way (i.e. bidirectional) communication between the transponders and reader in order to achieve this objective, thereby reducing the speed of arbitration and hence degrading the relative speed of movement accommodated between the transponders and reader. However, in practice, only a limited number of transponders (i.e. objects to be identified) can be accommodated within range of the excitation signal generated by the reader. This physical limit determines the maximum number of transponders which can be identified simultaneously. According to the present invention, as discussed above with reference to Table 1, each transponder or tag 3 can be programmed to delay its initial transmission by a variable amount, such that the likelihood of another transponder or tag 3 broadcasting at the same time is reduced. Hence, the likelihood of the signal from one tag 3 being received uncontested is substantially improved. This initial signal delay technique of the present invention does not require communication from the reader 1 to the transponder during the identification process and therefore does not significantly extend the length of the time required to identify several transponders.

In some applications, where it is known that the tags 3 will remain in the excitation field for a considerable period of time relative to the length of time taken to receive an identification message, it may be desirable to ensure that the tags 3 fall idle once identified and do not transmit further identification messages, thereby clearing the communications channel to the receiver 11 of reader 1 for use by other tags 3 entering the excitation field at a later time. The tag 3 of the present invention supports this function by means of programmability to offer a set number of retransmissions whilst it experiences a continuous excitation signal from the reader 1, thereby giving a further improvement to the simultaneous identification performance of the system. In addition, the value of the retransmission interval stored in a tag can be extended by a pseudo-random amount so that the period between a pair retransmissions (e.g. $Ri$ and $Ri+1$) is different than the period between the retransmissions $Ri+1$ and $Ri+2$. This simple technique effectively results in the ability to accommodate an unlimited number of tags 3 in the field of influence of the excitation signal, and each tag 3 entering the excitation field will be quickly identified without recourse to a complex two-way communication scheme as discussed in the prior art.

The use of keys for encryption and decryption is also well known in data encryption communication systems (e.g. military radio systems). According to such systems, the key is changed in a random fashion and applied to messages prior to transmission and on reception. The value of the key at any time is known to both the transmitter and receiver, and the algorithm under which the key is changed, and the encryption and decryption algorithms are also known to both the transmitter and receiver. Thus, once synchronization is achieved between the receiver and transmitter (e.g. the key is set to an initial value), the key can then be changed frequently and without making the key publicly known. This prior art type of system assumes that there is considerable intelligence in the form of a powerful microprocessor in both the transmitter and receiver.

Encryption has been applied to transponder identification systems as well. The broad ranging applications for identification transponders means that a tag might hold information in its memory that is either of itself sensitive, or the tag may be used for security access control purposes. In either case the system would benefit from an added degree of protection for the information transmitted by a tag, such that firstly the actual information contained in data patterns transmitted was not obvious, and secondly that electronic eavesdropping using sophisticated equipment to receive, reconstitute and re-broadcast a transmission would not, in the case of a security application, grant access to secure areas or information. The schemes devised for the current invention gives both facilities to the system.

One approach is disclosed in United Kingdom application GB 2,202,981, in which a key is broadcast to the transponder by the reader, which the transponder uses to encrypt its stored data prior to transmission. This approach suffers from the principal disadvantage that there is the requirement of two way communications between the reader and transponder, since the reader must give the key to a transponder in order that an encrypted message may be formatted and broadcast. This in turn means that the relative speed of movement between transponder and reader is reduced by comparison with the simple excitation/response sequence of the present invention, as discussed herein above.

In accordance with an additional feature of the present invention, data encryption is provided without the requirement to pass a key from the reader 1 to the transponder 3. Specifically, according to the invention, the tag 3 generates the encryption key itself, using a defined algorithm, such that the key varies in a pseudo-random fashion with a very long cycle length. The key is then used to encrypt the data stored in memory 37 prior to transmission. However, in order that the reader i can make use of the information and apply the correct key in order to decipher the received information signal, the key is embedded in the broadcast information signal from tag 3.

In the reader 1 of the present invention, a specific location is reserved in the memory of microcontroller 13 for storing the last received value of the encryption key. Subsequent transmissions by the same tag 3 will report a different key value. The reader 1 qualifies a received message by inspecting the last value of the encryption key associated with a particular tag 3, and if the key is different from the newly received value, then the message is regarded as valid whereas, in the event the keys are identical, the information signal is rejected (e.g. the bearer of the tag 3 would be denied access in a personnel identification system). This scheme prevents the recording and replay of a signal transmitted by a tag in an attempt to breach the security of the system, since the second (false) transmission will be treated as invalid by the reader.

FIG. 4 shows the typical character and message composition for information transmitted by tag 3.

Specifically, FIG. 4a shows an asynchronous serial frame, comprising a start bit (S), eight data bits (D0-D7), and a stop bit (P). The start bit is always logic 0 polarity, and the stop bit is always
  logic 1. The data bits may be of either state. The
  start bit is transmitted first (in time) and the stop bit last. The duration of each bit is the same. This
is a standard format used in serial data communications between computers and peripherals. The UHF receiver 11 of the reader 1 commences sampling with respect to the leading edge of the start bit, the validity of which is qualified by sampling the state of the start bit at its nominal centre in order to eliminate false start bits Caused by noise in the reception channel. Each data bit is sampled at its nominal centre, so the accuracy of each bit period need only be sufficiently good to ensure proper sampling over the length of one frame. Hence there is no need to provide a self-clocking modulation scheme with this type of frame format. By way of example, the practical implementation for this type of coding is effected in the preferred embodiment of the present invention by means of a frequency modulated transmitter 25 (FIG. 3), such that one logic state (logic 1, say) is transmitted at a frequency $[f_0+f_s]$, where $f_0$ is the fundamental frequency of the transmitter's reference oscillator, and the change in frequency caused by taking the modulation control signal from logic 0 to logic 1 is $2f_s$. In this practical example, a frequency shift keyed (FSK) modulation scheme is implemented.

FIG. 4b shows a synchronous serial frame, which comprises just eight data bits (D0-D7). Unlike the asynchronous frame there is no start or stop bit. Like the asynchronous frame, data bit D0 is transmitted first (in time) and D7 is transmitted last. The synchronous frame format is also widely used in computer communications. Unlike the asynchronous frame format, synchronous transmissions require either that the frequency of the transmit reference clock and receiver sampling clock are very closely matched, or (and more commonly) that a self-clocking scheme is employed. Using the above-mentioned FSK modulation scheme, it would be preferred that each data bit was represented by a portion of the upper transmission frequency $[f_0+f_s]$ and a portion of the lower transmission frequency $[f_0-f_s]$. An example of a practical scheme would be to use a so-called Manchester encoded scheme, where each bit of a character was transmitted such that the first half of a bit was transmitted at $[f_0+f_s]$ and the second half of the bit was transmitted at $[f_0-f_s]$ if the state of the data bit was logic 1, or $[f_0-f_s]$ followed by $[f_0+f_s]$ if the state of the data bit was logic 0. Hence the receiver can extract a clocking (sampling) signal on a bit-by-bit basis, thereby maintaining sampling timing accuracy of the message length.

As described herein above, one programmable feature of the present invention permits the tag 3 to transmit its stored data in either of these formats, character by character, with the speed of transmission (the bit period) also being programmable to match standard data communications speeds.

FIG. 4c shows a string of "n" characters, each composed in an asynchronous serial frame. There may be any number of characters between character "a" and end character "n". It should be noted that there is not of necessity contiguity between successive characters, and the interval between character frames may vary. The interval between character "b" and character "n" is filled with other characters, with intervals between those characters which may be variable.

FIG. 4d shows a string of "n" synchronous character frames, composed to form a synchronous character string. It should be noted that there is no interval between successive characters in this mode, and that the interval between character "c" and character "n" in FIG. 4d is an integer multiple of the time taken to transmit one character and will in practice be filled with contiguous character frames.

Referring now to FIG. 4e, a message composition is shown which is independent of the frame format and method of modulation. Each character "a" to "n" is either an asynchronous character frame or a synchronous character frame, and each block in FIG. 4e which represents a single character frame is deemed to include any framing (start and stop) bits present (in the case of an asynchronous frame format).

It is a programmable feature of the present invention that the length of a message comprising "n" character frames is variable; that is "n" is a programmable variable. As discussed herein above, the information stored in the tag's data memory 37 is held in a "free-field" format, which means that the contents of the memory is variable and open to interpretation which will depend upon the application of the tag. That is to say the user of the system can store in the tag's memory 37 any information, held in 8 bit frames, so that it is quite practical to store in locations for characters "a" and "b" two synchronization characters which are required to allow a receiver operating in a synchronous reception mode to discern the start of a message from a tag, for example. Similarly error checking information would typically be transmitted in character positions "n−2", "n−1", with a closing flag in position "n" in accordance with a standard synchronous data link protocol.

Furthermore, as discussed herein above, it is an additional feature of the present invention that tag 3 may be configured to apply an encryption algorithm to the data stored in its memory 37 prior to transmission, and that in the scheme devised the encryption key is included in the message transmitted by the tag. The encryption key is embedded in a transmitted message in a location known to the reader 1 (which may be variable), so that the reader may decipher a received message which has been encrypted.

Additional structural and operational details of the tags 3 are provided below with reference again to FIG. 3 of the drawings, comprising a current best mode of the invention. Of course, additional modes and embodiments are possible within the scope of the present invention.

Field Detector 21

Low frequency signal receiver 21 comprises a ferrite cored inductor 31, which is brought to resonance at the frequency of the excitation signal, by parallel tuning capacitor 33. The output signal from this tuned circuit is applied to the base of a transistor 34. Sufficient bias current flows into the base of transistor 34 to cause it to conduct when the voltage developed across the tuned circuit exceeds approximately 600 mV. The collector of transistor 34 is connected to an amplitude demodulator comprising resistor R1 and integrator capacitor C1, so that a signal detected by antenna 31 will cause a signal to be passed to the control circuit 23 indicating the presence of an excitation signal.

Control Circuit 23

The control circuit 23 in this practical example is an 8-bit CMOS microcontroller and comprises mask-programmable ROM (program memory 38), RAM (data memory 37) a timer and data processing circuitry (control logic 39), input/output ports (input/output logic 41), and operating mode control logic (wake-up logic 35). It is continuously powered from the lithium cell 45 which has a nominal terminal voltage of 3 V (for a lithium manganese-dioxide cell). Control circuit 23 derives its internal timing from an on board oscillator, which has a ceramic resonator X1 as its frequency determining element.

Whilst the tag 3 is remote from the influence Of the electromagnetic field generated by the transmit antenna 7 of the reader, the tag is in a quiescent stage, in which it consumes minimum current from its lithium cell 45. The control circuit is in a "sleep" stage, with its oscillator and the UHF transmitter 25 disabled. In this "sleep" mode, the control circuit 23 is responsive to a logic low signal from the field detector circuit 21. When the voltage on the collector of 34 goes low, the control circuit is brought out of the sleep mode and its oscillator is restarted. During the short period whilst the oscillator is stabilizing, the control circuit is prevented from executing instructions by internal logic. The control circuit 23 will power-up and enable the UHF transmitter 25 periodically, and produce response signals by applying modulation control signals via an output pin. The composition of the data and the rate at which it is presented via the modulation control line is determined by the information stored in the data memory 37 of the control circuit.

When the tag 3 no longer experiences an excitation signal detectable by the field detector 21, the voltage on the collector of 34 rises, and the control circuit may stop transmission of response signals, then place itself in a sleep mode ready for detection of the next excitation signal. It may be that the control circuit 23 has been programmed by instructions from reader 1 to ignore the state of the signal from the field detector circuit 21 until it has completed transmission of an identification message or messages, in which case there will be a delay between the collector of 34 going high and the cessation of transmissions by the tag 3.

During the period immediately following cessation of transmissions by the tag 3 and after removal of the excitation signal, the control circuit 23 will monitor the output from the field detector circuit 21 or modulations which might have originated from reader 1, since this is the method of communicating instructions and data to the tag 3. If correct modulations are detected, the control circuit 23 enters a receptive mode in which it will monitor the carrier detect line for further modulated signals. Properly coded signals will cause the control circuit 23 to accept data for storage in its data memory 37 for subsequent transmissions.

UHF Transmitter 25

The UHF transmitter 25 is essentially an oscillator with Q1 as its active element, which is designed to radiate a very low level of signal through transmit antenna 43, which may for convenience be a profiled track on the printed circuit board (PCB) on which the other components of the tag are mounted. Modulation may be applied to the oscillator which causes the frequency of oscillation to vary slightly, thereby allowing transmission using a frequency shift keyed (FSK) system.

The circuit 25 comprises high frequency transistor Q1, which has an inductive collector load in the form of a PCB track, with feedback capacitor C3 between collector and emitter to form a simple Colpitts oscillator. The ferrite bead FB1 is included since it presents an impedance which rises very sharply above the fundamental frequency of the oscillator, thereby significantly reducing the harmonic distortion in the output signal. The fundamental frequency of this oscillator is determined by a surface acoustic wave (SAW) resonator F1.

The operation of the transmitter 25 is controlled by the control circuit 23, the oscillator is enabled by applying bias directly from an output pin via resistor R2 to the base of Q1. When the control (bias) voltage is high, the oscillator is enabled. The base voltage is set by double diode D1 and is thus independent of the supply voltage. When the bias voltage is low, the oscillator is disabled, and the circuit consumes negligible current. The output from the oscillator is peaked by variable capacitor C5, which predominantly affects amplitude and to a much lesser extent frequency.

Modulation is applied to the transmitter 25 by applying a control voltage through resistor R3 to diode D2, which, whilst not being a true variable capacitance diode, exhibits a change in reverse capacitance with applied voltage sufficient to alter the impedance of the collector load circuit and pull the frequency of the oscillator. This variable load capacitance is coupled to the collector circuit by capacitor C2. A frequency modulation scheme is thereby operated by the control circuit. Naturally, a 100% amplitude modulated signal can be generated at one of two frequencies simply by gating the base bias on and off at the required rate.

Figure 5:
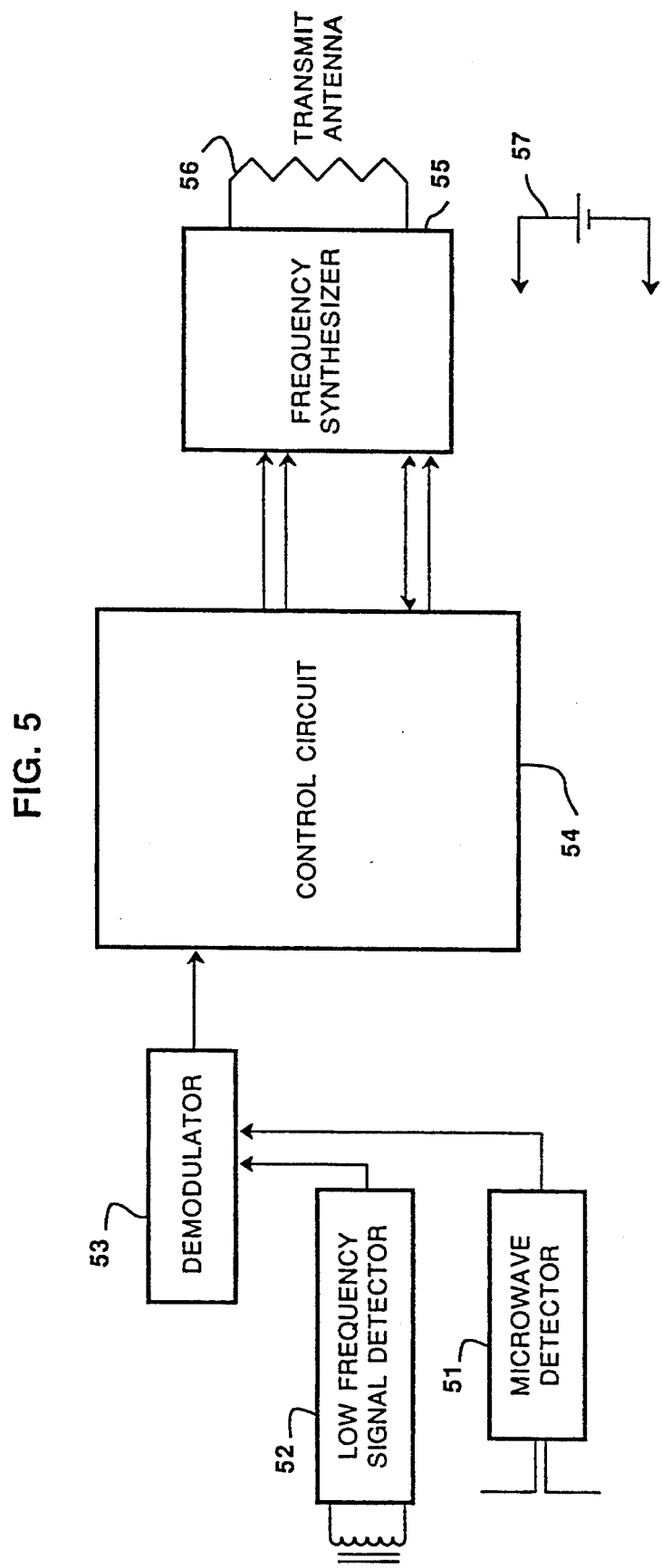
FIG. 5 is a block diagram of the transponder on tag in accordance with the preferred embodiment.
Figure 6:
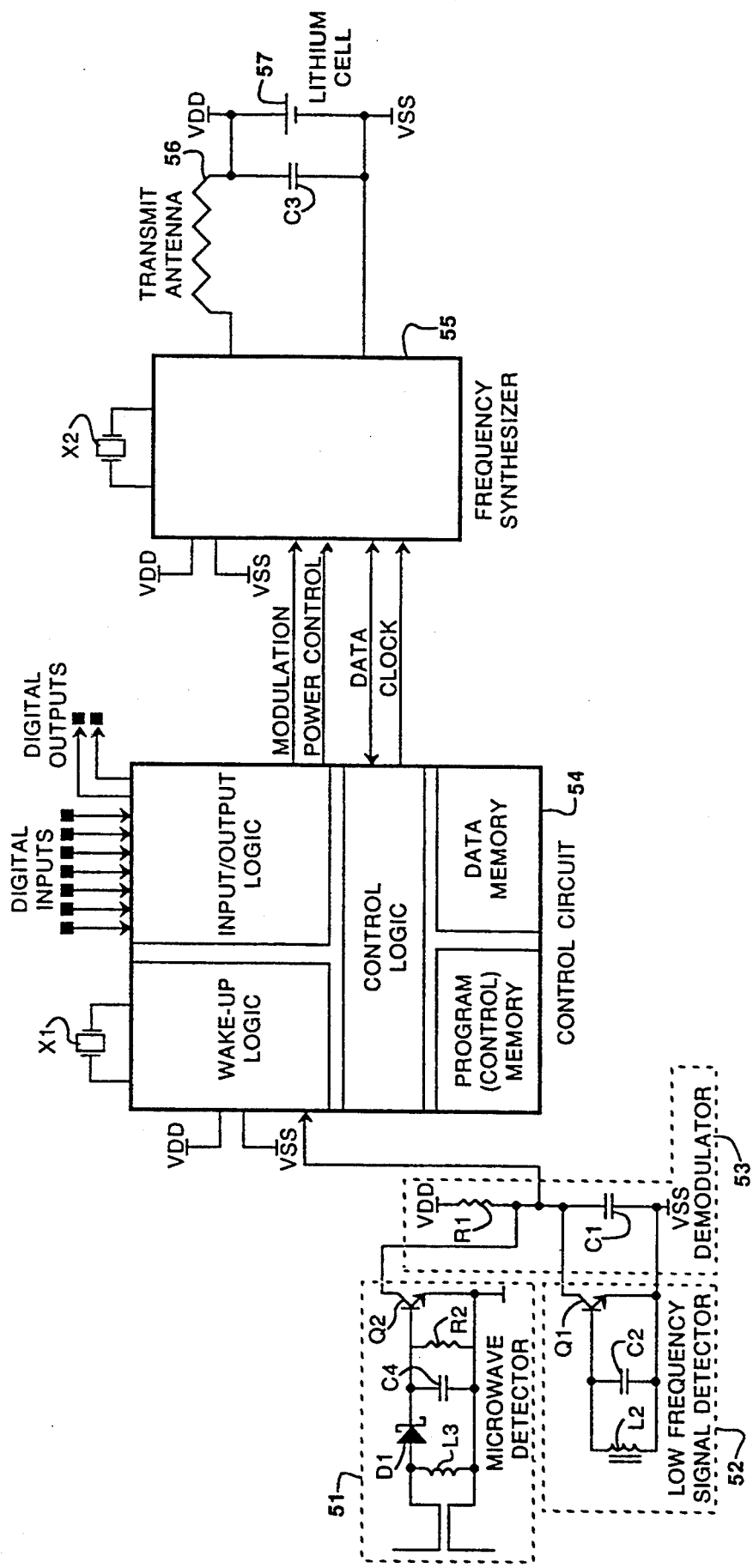
FIG. 6 is a partial schematic block diagram of the transponder illustrated in FIG. 5.

Turning to FIGS. 5 and 6, a transponder according to the preferred embodiment is shown comprising signal receivers 51 and 52, a demodulator 53, a control circuit 54, frequency synthesizer 55, transmit antenna 56 and a cell 57.

Detectors 51 and 52 are shown by way of example as being low frequency and microwave detector circuits, respectively. However, other frequency specific detectors may be utilized.

Microwave detector 51 comprises a half-wave dipole antenna in the form of strips on a printed circuit board, radio frequency choke L3 and Schottky detector diode D1. The energy detected is stored as a charge on capacitor C4, and resistor R2 provides a DC path to the reference level $V_{ss}$ for diode D1. The voltage developed across capacitor C4 causes bias current to flow into the base of transistor Q2.

Low frequency signal receiver 52 comprises a ferrite cored inductor L2, which is brought to resonance at the frequency of the excitation signal by parallel tuning capacitor C2. The output signal from this tuned circuit is applied to the base of transistor Q1. sufficient bias current flows into the base of transistor Q1 to cause the transistor to conduct when the voltage developed across the tuned circuit exceeds approximately 600 mV. The collector of transistor Q1 is connected to the collector of transistor Q2 and to the demodulator 53, so that either a signal detected by a low frequency signal detector 51 or by microwave signal detector 52 will cause a signal to be passed to the control circuit 54 indicating the presence of excitation signal.

In common with the transponder discussed above with reference to FIGS. 2 and 3, various programmable features are provided and the operation of the transponder may be modified by modulated signal programming.

In the preferred embodiment illustrated, amplitude demodulator 53 comprises a resistor R1 and a capacitor C1. Either transistor Q1 or transistor Q2 is capable of clamping the voltage on the integrator capacitor C1 in order to indicate the presence of an excitation signal to the control circuit 54.

Circuit 54 controls operation of the transponder. In the absence of a signal from the demodulator 53, the control circuit 54 is in a quiescent state. The control circuit down powers the frequency synthesizer 55, and places itself in a mode where it consumes least current. The control circuit 54 exits the quiescent state in response to detection of an excitation signal. According to the preferred embodiment, control circuit 54 is manufactured as a custom-designed integrated circuit fabricated in CMOS technology. Alternatively, the control circuit 54 can be in the form of a mask programmed 4 or 8 bit CMOS micro controller, such as the 84C00 family of micro controllers manufactured by Philips Components, such a device containing the functional blocks shown in FIG. 5 necessary to control the operation of the transponder, including a data memory where identification data may be stored.

The control circuit 54 manages the operation of the frequency synthesizer 55, via the clock and data lines shown, by passing data to be transmitted via the modulation control line, and is able to place the synthesizer in a powered-down state by actuation of a power control signal.

Frequency synthesizer 55 comprises principally a crystal controlled reference oscillator and a digital phase locked loop which acts to produce frequency multiplication, and includes a voltage controlled oscillator. A detailed description of the elements of the frequency synthesizer is not provided herein, as the design and principles of operation of such devices are well known in the industry. For example, a well known frequency synthesizer is the UMA1014 manufactured by Philips Components.

As discussed above, the control circuit 54 provides instructions to the frequency synthesizer 55 via the clock and data control lines, including the setting of the transmit frequency. Modulation is applied to the frequency synthesizer 55 from control circuit 54 via the modulation control signal line. This modulation may affect the amplitude, frequency or phase of the transmitted signal, which is propagated by transmit antenna 56 for reception by a receiver which is tuned to the transmission frequency of the transponder.

The manner in which the transponder is programmed, for example to direct the control circuit 54 to pass an instruction to the frequency synthesizer 55 to select a particular response frequency, is discussed above in greater detail.

The transponder circuit is powered by a small primary cell 57, which may use lithium-manganese dioxide or lithium-thionyl chloride chemistries, for example.

In summary, according to the present invention, an identification system is provided in which sustained presence of the tag or transponder is not required for transmission of an identification information signal. Independence between the receiver and transmitter of the tag permits transmissions of data at standard rates and with standard formats, and permits the concepts described to be applied to any system independent of the frequencies of operation. Additional powerful features such as data encryption and the programmable characteristics of the tags described are features in isolation and not reliant upon the separation between receiver and transmitter.

Other embodiments and variations of the present invention are possible within the sphere and scope of the claims appended hereto.

For example, the number of signal receivers detectors in the preferred embodiment of FIGS. 5 and 6 need not be limited to only two as shown. Theoretically, an unlimited number of excitation signal receivers can be employed allowing the transponder to be excited by a wide range of excitation frequencies. An alternative implementation could use a signal receiver which scans across a range of frequencies.

We claim:

1. An electronic identification system comprising:
    a) means for generating an electromagnetic excitation field at a first frequency settable to a plurality of different frequencies;

b) portable transponder means including means for storing variable identification data, and means for detecting ingress of said portable transponder means into said electromagnetic excitation field and in response transmitting at a second frequency settable to a plurality of different frequencies an informational signal containing said data, said transmitting of said signal being independent of said transponder means remaining in said field, said second frequency being neither derived from nor related to said first frequency of the electromagnetic excitation field, and said first and second frequencies remaining constant during transmission of said information signal; and c) means for receiving said informational signal and in response generating an output signal representing said variable identification data contained in said informational signal.

2. The system of claim 1 wherein said transponder means is adapted for attachment to an object to be identified, and further comprises:

a) a receiver tuned to said first frequency for detecting said field, b) a memory for storing said variable identification data, c) logic means for retrieving said data from said memory responsive to said receiver detecting said field and in response generating said information signal, d) a transmitter for receiving said information signal from said logic means and in response transmitting said information signal at said second frequency.

3. The system of claim 2 wherein said transponder means further comprises a plurality of external input ports for receiving external input data, and means for sampling said external input ports and in response encoding and transmitting said input data as part of said information signal.

4. The system of claim 1 further comprising circuitry within said transponder means for encrypting said information signal prior to transmission thereof, and circuitry within said means for receiving for decrypting said information signal prior to generating said output signal.

5. The system of claim 1 wherein said transponder means is adapted to transmit a further information signal responsive to said transponder means egressing from said field.

6. The system of claim 1 wherein said transponder means is programmable for transmitting said information signal in accordance with standard data format and data rates.

7. The system of claim 1 wherein said transponder means is adapted to delay transmission of said information signal by a pseudo-randomly varying amount upon entering said field.

8. The system of claim 1 wherein said means for generating said electromagnetic excitation field comprises a low frequency (LF) radio transmitter connected to a loop antenna.

9. The system of claim 1 wherein said means for receiving comprises an ultra-high frequency (UHF) receiver connected to a microcontroller.

10. The system of claim 2 wherein said receiver comprises a low-frequency (LF) tuned antenna connected to a passive field detector circuit.

11. The system of claim 2 wherein said transponder means further comprises a battery power source and means for monitoring charge in said battery power source and incorporating data representing said charge in said information signal.

12. The system of claim 1 wherein said means for generating is adapted to modulate said excitation field in accordance with a variable programming signal for programming said memory responsive to said transponder means entering said field.

13. The system of claim 4 wherein said circuitry within said transponder means further comprises means for generating a pseudo-random varying key associated with each transmission of said information signal, said key being generated in accordance with a variable algorithm, means for encrypting said information signal using said key, and means for embedding said key in encrypted information signal.

14. The system of claim 13 wherein said circuitry within said means for receiving further comprises means for locating said key in said encrypted information signal and in response decrypting said information signal using said key.

15. The system of claim 14 wherein said circuitry within said means for receiving further comprises means for storing successive values of said key and comparing each said key located in said information signal with the prior stored key, and in the event the compared keys are identical the decrypted information signal is rejected whereas in the event the compared keys are different the decrypted information signal is accepted.

16. The system of claim 1 wherein said transponder means is adapted for attachment to an object to be identified, and further comprises:

(a) a receiver for scanning a range of frequencies in order to detect said electromagnetic excitation field at said first frequency, (b) a memory for storing said variable identification data, (c) logic means for retrieving said data from said memory responsive to said receiver detecting said field and in response generating said information signal, and (d) a transmitter for receiving said information signal from said logic means and in response transmitting said information signal at said second frequency.

17. A system of claim 1 wherein said transponder means is adapted for attachment to an object to be identified and further comprises:

(a) a plurality of receivers tuned to respective frequencies for detecting said field at a predetermined one of said respective frequencies, (b) a memory for storing said variable identification data, (c) circuit means for retrieving said data from said memory responsive to detection of said field at said predetermined one of said frequencies and in response generating said information signal, and (d) a transmitter for receiving said information signal from said circuit means and in response transmitting said information signal at said second frequency.

18. The system of claim 17 wherein said plurality of receivers comprises a microwave detector and a low frequency signal detector, respectively.

19. The system of claim 18 further comprising a demodulator for demodulating signals received by said microwave detector and low frequency signal detector, respectively.

20. The system of claim 19 further comprising a frequency synthesizer connected to said circuit means for receiving control signals from said circuit means and in response generating and transmitting said information signal at said second predetermined frequency as specified by said control signals.

21. The system of claim 1 wherein said first frequency is selectable for optimum performance dictated by application, and wherein said transponder means is adapted for attachment to an object to be identified, and further comprises:

(a) an adaptive receiver for detecting said first frequency,
b) a memory for storing said variable identification data,
c) logic means for retrieving said data from said memory responsive to said receiver detecting said first frequency and in response generating said information signal,
d) a transmitter for receiving said information signal from said logic means and in response transmitting said information signal at said second frequency.

* * * * *